United States Patent [19]

Saida et al.

[11] 4,026,872
[45] May 31, 1977

[54] EPOXY RESIN COMPOSITIONS

[75] Inventors: Kenichi Saida, Hitachiota; Masahiko Sakai, Hitachi; Toshikazu Narahara, Ibaraki, all of Japan

[73] Assignee: Hitachi, Ltd., Japan

[22] Filed: May 11, 1976

[21] Appl. No.: 685,532

[30] Foreign Application Priority Data

May 21, 1975 Japan .............................. 50-59622

[52] U.S. Cl. ............................... 260/59 R; 260/831
[51] Int. Cl.$^2$ .................... C08L 61/10; C08L 63/02
[58] Field of Search .......................... 260/831, 59 R

[56] References Cited

UNITED STATES PATENTS

| | | | |
|---|---|---|---|
| 3,493,630 | 2/1970 | Salensky | 260/831 |
| 3,563,850 | 2/1971 | Stackhouse et al. | 161/184 |
| 3,838,094 | 9/1974 | Sporck | 260/37 EP |
| 3,862,260 | 1/1975 | Sellers et al. | 260/831 |

Primary Examiner—Harold D. Anderson
Assistant Examiner—Earl A. Nielsen
Attorney, Agent, or Firm—Craig & Antonelli

[57] ABSTRACT

In an epoxy resin composition comprising an alicyclic epoxy resin, a curing agent having phenolic hydroxyl group in its molecule and an imidazole curing accelerator, excellent thermal resistance and excellent mechanical properties can be given to the cured epoxy resin composition by blending 100 parts by weight of 2-(3,4-epoxy)cyclohexyl-5,5-spiro(3,4-epoxy)cyclohexane-m-dioxane as the alicyclic epoxy resin, 25 to 50 parts by weight of a phenol-formaldehyde condensate as the curing agent having phenolic hydroxyl group in its molecule and 0.1 to 15 parts by weight of at least one imidazole compound selected from the group consisting of 2-phenylimidazole, 2-undecylimidazole, 2-heptadecylimidazole, 2-phenyl-4-methylimidazole, 1-cyanoethyl-2-methylimidazole, 1-cyanoethyl-2-ethyl-4-methylimidazole, 1-cyanoethyl-2-methyl-4-ethylimidazole, 1-cyanoethyl-2-undecylimidazole, 1-cyanoethyl-2-phenylimidazole, 1-azine-2-methylimidazole, 1-azine-2-undecylimidazole and 1-azine-2-ethyl-4-methylimidazole as the imidazole curing accelerator.

6 Claims, No Drawings

EPOXY RESIN COMPOSITIONS

BACKGROUND OF THE INVENTION

The present invention relates to an epoxy resin composition. More particularly, the invention pertains to an epoxy resin compensation comprising an alicyclic epoxy resin, a curing agent having phenolic hydroxyl group in its molecule and an imidazole curing accelerator.

It is well known that epoxy resins are widely used as electric insulating materials, for example, as an insulating material for conductors of rotary electric machines. There are provided various epoxy resin compositions, any one of which is far superior to the other thermosetting resins such as phenol resin in properties such as electrical properties and thermal resistance. However, the epoxy resin compositions are considerably inferior to silicone resins particularly in thermal resistance, and are still unsatisfactory as an insulating material for large rotary electric machines which require excellent thermal resistance, for example, thermal resistance of at least class H (at least 180° C). Also, as a resin used in the prepreg insulation method which is recently often employed, the epoxy resin compositions are unsatisfactory in the storage stability of resin compositions (varnishes), curability, flexibility after semicure, that is, when formed into a prepreg tape, and thermal resistance (heat deterioration characteristic) and mechanical strengths, particularly bending strength, after cure. Particularly, there is no epoxy resin composition which can be used as a resin for prepreg insulation method having thermal resistance of at least class H.

An object of the present invention is to provide an epoxy resin composition which can give a cured product having excellent thermal resistance and excellent mechanical properties.

Another object of the invention is to provide an epoxy resin composition which shows good flexibility in a dry state or a semi-cured state.

SUMMARY OF THE INVENTION

According to the present invention, there is provided an epoxy resin composition comprising an alicyclic epoxy resin, a curing agent having a phenolic hydroxyl group in its molecule and an imidazole curing accelerator, characterized in that said composition is obtained by blending 100 parts by weight of 2-(3,4-epoxy)cyclohexyl-5,5-spiro(3,4-epoxy)cyclohexane-m-dioxane as the alicyclic epoxy resin, 25 to 50 parts by weight of a phenol-formaldehyde condensate as the curing agent having phenolic hydroxyl groups in its molecule and 0.1 to 15 parts by weight of at least one imidazole compound selected from the group consisting of 2-phenylimidazole, 2-undecylimidazole, 2-heptadecylimidazole, 2-phenyl-4-methylimidazole, 1-cyanoethyl-2-methylimidazole, 1-cyanoethyl-2-ethyl-4-methylimidazole, 1-cyanoethyl-2-methyl-4-ethylimidazole, 1-cyanoethyl-2-undecylimidazole, 1-cyanoethyl-2-phenylimidazole, 1-azine-2-methylimidazole, 1-azine-2-undecylimidazole and 1-azine-2-ethyl-4-methylimidazole as the imidazole curing accelerator.

The present inventors have now found that a specific combination of the above-mentioned resin, curing agent and curing accelerator has a quite unexpected effect as compared with various prior art combinations, and have completed the present invention. Thus, the epoxy resin compositions of the present invention are particularly superior to all prior art epoxy resin compositions in the thermal resistance and mechanical properties of the cured product. As for thermal resistance, the bending strength after heat deterioration of the epoxy resin compositions of the present invention is at least four times as high as that of prior art epoxy resin compositions.

2-(3,4-Epoxy)cyclohexyl-5,5-spiro(3,4-epoxy)-cyclohexane-m-dioxane used in the present invention is represented by the formula

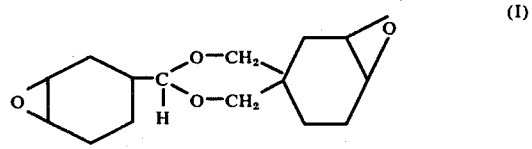

and is commercially available from, for example, Ciba-Geigy Co. under the trademark of "CY-175".

As the phenol-formaldehyde condensate as a curing agent, already known ones such as, for example, condensates of formaldehyde with phenol compounds such as 2,2-bis-(4-hydroxyphenyl)propane, pyrogallol, dihydroxydiphenyl, o-, m- and p-hydroxybenzaldehydes, catechol, resorcinol, hydroquinone, phenol, o-, m- and p-chloro- and bromo-phenols and o-, m- and p-nitrophenols, phenol-xylenedimethoxybenzene condensates and phenoldimethoxymethyldiphenylether condensates may be used. Particularly useful is phenol-formaldehyde condensate. The above-mentioned curing agent is used in an amount of 25 to 50 parts by weight, and preferably 30 to 40 parts by weight, per 100 parts by weight of the above-mentioned epoxy resin (I). If the amount is less than 25 parts by weight, thermal resistance becomes poor and reduction in mechanical strength after heat deterioration becomes large. Also, if the amount is larger than 50 parts by weight, cure becomes unsatisfactory and there is the possibility that electrical properties, and particularly tan δ-temperature characteristic, deteriorate.

As the curing accelerator, at least one of the above-mentioned imidazole compounds may be used. In addition to the above-mentioned imidazole compounds, there are imidazole curing accelerators such as, for example, 2-methylimidazole, 2-ethylimidazole, 2-ethyl-4-methylimidazole, 1-propyl-2-methylimidazole and 1-benzyl-2-methylimidazole. If these imidazole compounds are used, however, the storage stability of the resulting epoxy resin compositions (varnishes) or prepreg tape becomes very poor and the objects of the present invention can not be achieved.

The above-mentioned imidazole compounds used in the present invention may be used in an amount of 0.1 to 15 parts by weight, and preferably 0.5 to 10 parts by weight, per 100 parts by weight of the epoxy resin. If the amount of the above-mentioned imidazole compounds blended is less than 0.1 part by weight, a satisfactory addition effect can not be obtained. Thus, curing temperature becomes higher, curing time is required to be prolonged, and the electrical and mechanical properties of the cured product are deteriorated. If the amount exceeds 15 parts by weight, the storage stability of the compositions (varnishes) or prepreg tape becomes very poor.

According to the present inventors' studies, it has been confirmed that the tape winding property of the prepreg tape can be remarkably improved without reducing the heat deterioration resistance by using as the alicyclic epoxy resin a combination of the above-mentioned 2-(3,4-epoxy)cyclohexyl-5,5-spiro(3,4-epoxy)cyclohexane-m-dioxane (I) and 3,4-epoxycyclohexylmethyl-3,4-epoxycyclohexanecarboxylate represented by the formula

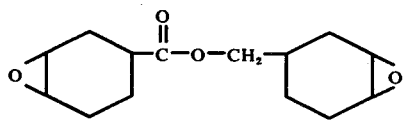

(II)

Further, the addition of the compound (II) makes a great contribution toward the control of the viscosity of the varnish. When a combination of the compounds (I) and (II) is used, the amount of the compound (II) is preferably 10 to 60% by weight per 90 to 40% by weight of the compound (I), and more preferably 20 to 50% by weight per 80 to 50% by weight of the compound (I). If the amount of the compound (II) blended is less than 10% by weight, the addition effect can substantially not be obtained. Also, if the amount is more than 60% by weight, heat deterioration resistance in mechanical properties becomes poorer.

Further, the present inventors have confirmed that the thermal resistance (heat distortion temperature) of the cured product can be improved by using vinylcyclohexenedioxide represented by the formula

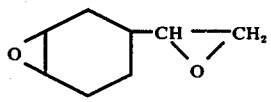

(III)

together with the alicyclic epoxy resin (I) or a mixture of the alicyclic epoxy resins (I) and (II). Also, the viscosity control of varnishes and the flexibility and winding property around a conductor of the prepreg tape can also be improved. When the compound (III) is used, the amount of the compound (III) blended is preferably 5 to 20 parts by weight, and more preferably 8 to 15 parts by weight, per 100 parts by weight of a mixture consisting of 90 to 40 parts by weight of the compound (I) and 10 to 60 parts by weight of the compound (II). If the amount is less than 5 parts by weight, the addition effect can substantially not be obtained. Also, if the amount is more than 20 parts by weight, heat distortion temperature rather disadvantageously decreases.

The epoxy resins consisting of the compound (I) and the compound (III) are also effective in the present invention. In this case, the amount of the compound (III) blended is preferably 5 to 30% by weight per 95 to 70% by weight of the compound (I). If the amount blended is less than 5% by weight, improvement in heat distortion temperature can not be expected. If the amount exceeds 30% by weight, heat distortion temperature decreases.

In the present invention, there is no harm in using the compound (II) and/or the compound (III) together with the compound (I) in an amount which is less than the above-mentioned lower limits, and there is no possibility that the properties of the cured product are deterioated.

When the compound (II) and/or the compound (III) are used together with the compound (I) in the present invention, the amount of the above-mentioned curing agent blended may be within the above-mentioned range per 100 parts by weight of all the epoxy compounds.

The epoxy resin compositions of the present invention are useful for casting molding, impregnation molding, bonding and coating. Above all, an effective utilization is to use them as a varnish for prepreg. As an epoxy resin prepreg tape or sheet, only those having thermal resistance of at most class F have heretofore been provided, and silicone resins have been used in prepreg tapes having thermal resistance of higher than class F. However, the silicone resin prepreg tapes have defects in that their price is remarkably high, the mechanical strengths of an insulating layer obtained by winding the tapes around a coil and molding and then curing the whole are low, and abnormal abrasion of the brush of rotary electric machines is caused by the generation of $SiO_2$ on use for a long period of time. The commercial value of the present invention is very large in that all of the above-mentioned defects can be obviated by the use of the epoxy resin compositions of the present invention. When the epoxy resin compositions of the present invention are used as a varnish for prepreg, the compositions can be coated onto or impregnated into a prepreg substrate as such if the compositions have a low viscosity. However, it is generally advantageous to use the epoxy resin compositions of the present invention in the form of a solution thereof in an inert organic solvent such as a ketone, a glycol ether, a glycol ester, a hydrocarbon or a chlorinated hydrocarbon. As the prepreg substrate, there may be used papers, fiber woven fabrics, fiber non-woven fabrics, synthetic resin films (tapes), laminated mica sheet and flaky mica sheet. The papers include Japanese paper, linter paper, kraft paper and the other known insulating paper. The fiber woven fabrics, fiber non-woven fabrics and synthetic resin films (tapes) include inorganic and organic fibrous base materials such as glass fiber, asbestos fiber, cotton, silk, polyester fibers (films), rayon fibers (films), polyamide fibers (films), polyamideimide fibers (films), polyethylene film and polypropylene film. The above-mentioned prepreg base materials are coated or impregnated with the epoxy resin compositions and then dried or semi-cured to obtain the desired epoxy resin prepreg tape or sheet. In this case, the resin concentration of the varnish and the amount of the resin deposited on the above-mentioned prepreg substrate are not particularly limited and can be freely selected.

In the present invention, other epoxy resins may be added to the desired epoxy resin compositions within such a range as storage stability and the electrical properties of the cured product are substantially not deteriorated.

The following examples and reference example illustrate the present invention, but the present invention is not limited to these examples. For example, the blending ratio of each component can be freely varied within the above-mentioned range. Also, use can be selected in the same manner as in prior art epoxy resin compositions. In the examples and reference example, all parts are expressed by weight unless otherwise indicated.

EXAMPLE 1

The amounts as shown in Table 1 of 2-(3,4-epoxy)cyclohexyl-5,5-spiro(3,4-epoxy)cyclohexane-m-dioxane (CY-175 manufactured by Ciba-Geigy Co.) and a phenol-formaldehyde condensate (HP-203N manufactured by Hitachi Kasei Kogyo K.K., OH value 107, softening point 65° – 72° C) and 1-azine-2-undecylimidazole ($C_{11}Z$-AZINE) were dissolved in a mixture of 65 parts of methyl ethyl ketone and 65 parts of acetone to prepare several epoxy resin compositions (varnishes). The gel time (curability) of the above-mentioned varnishes is as shown in Table 1.

The above-mentioned varnishes were then coated onto and impregnated into a composite substrate obtained by putting a glass cloth of 0.03 mm in thickness on the top of a laminated mica sheet of 0.1 mm in thickness, and then lightly pressed by a roller. After pre-drying at room temperature, the varnishes were heated at 120° C for 18 minutes to form a semi-cured state. Thus, insulating prepreg mica sheets having a thickness of 0.20 to 0.26 mm were prepared. Ten sheets of the insulating prepreg mica sheets were put on the top of one another. The assembly was placed on a hot board of a press at a temperature of about 130° C, and a pressure of 30 kg/cm² was applied to the assembly, which was then heated to 170° C in 20 to 30 minutes. Curing was carried out by heating and pressing at this temperature for 3 hours to obtain a hard laminated sheet. The properties of the prepreg sheets and laminated sheets thus obtained are shown in Table 1.

Table 1

| Sample No. | CY-175 (Parts) | HP-203N (Parts) | $C_{11}Z$-AZINE (Parts) | Gel time (min.) of varnish at 150° C | Storage stability (days) of prepreg mica sheet | Temperature at which dielectric loss tangent of laminated sheet becomes 10 % (° C) | Bending strength (kg/cm²) at 180° C | |
|---|---|---|---|---|---|---|---|---|
| | | | | | | | Initial stage | After deterioration at 25° C for 30 days |
| 1 | 100 | 25 | 3 | 10.5 | >60 | 182 | 1680 | 861 |
| 2 | 100 | 35 | 3 | 10.5 | 40–50 | 200 | 2537 | 1430 |
| 3 | 100 | 50 | 3 | 12.9 | 30–40 | 180 | 2325 | 1250 |
| 4 | 100 | 30 | 0.1 | 6.5 | >60 | 165 | 815 | 1490 |
| 5 | 100 | 30 | 5 | 8.5 | 40–50 | 202 | 2623 | 1530 |
| 6 | 100 | 30 | 15 | 5.5 | 20–30 | 205 | 2615 | 1470 |

In Table 1, the storage stability of the prepreg sheet was represented as the number of days for which the sheet had to be allowed to stand until the tape was broken when the sheet was allowed to stand at a temperature of 25° C and then wound around a 3/16 inch mandrel (40° C) at 40° C. Also, the dielectric loss tangent was measured at 50 Hz and 1000 V. This is also applicable to the other examples as described below.

EXAMPLE 2

The amounts as shown in Table 2 of an epoxy resin mixture consisting of 2-(3,4-epoxy)cyclohexyl-5,5-spiro(3,4-epoxy)cyclohexane-m-dioxane (CY-175) and 3,4-epoxycyclohexylmethyl-3,4-epoxycyclohexanecarboxylate (Ch-221 manufactured by Chisso Co.), a phenol-formaldehyde condensate (HP-203N) and 1-azine-2-undecylimidazole ($C_{11}Z$-AZINE) were dissolved in a mixture of 65 parts of methyl ethyl ketone and 65 parts of acetone to prepare several epoxy resin compositions. Prepreg mica sheets and laminated sheets were obtained by the use of the above-mentioned compositions in the same manner as in Example 1. The properties of the sheets and laminated sheets thus obtained are shown in Table 2.

Table 2

| Sample No. | CY-175 (Parts) | Ch-221 (Parts) | HP-203N (Parts) | $C_{11}Z$-AZINE (Parts) | Gel time (min.) of varnish at 150° C | Storage stability (days) of prepreg mica sheet | Temperature at which dielectric loss tangent of laminated sheet becomes 10 % (° C) | Bending strength (kg/cm²) at 180° C | |
|---|---|---|---|---|---|---|---|---|---|
| | | | | | | | | Initial Stage | After deterioration at 25° C for 30 days |
| 7 | 90 | 10 | 35 | 3 | 10.7 | 40–50 | 198 | 2381 | 1497 |
| 8 | 70 | 30 | 35 | 3 | 11.0 | >60 | 201 | 2410 | 1510 |
| 9 | 60 | 40 | 35 | 3 | 11.1 | >60 | 207 | 2599 | 1576 |
| 10 | 40 | 60 | 35 | 3 | 12.5 | >60 | 183 | 1962 | 1101 |

In Table 2, the storage stability of the prepreg sheet was represented as the number of days for which the sheet had to be allowed to stand until the tape was broken when the sheet was allowed to stand at a temperature of 25° C and then wound around a 3/16 inch mandrel (25° C) at 25° C. This is also applicable to the other examples as described below.

EXAMPLE 3

2-(3,4-epoxy)cyclohexyl-5,5-spiro(3,4-epoxy)cyclohexane-m-dioxane (CY-175), vinylcyclohexenedioxide (Ch-206 manufactured by Chisso Co.), a phenol-formaldehyde condensate (HP-203N) and 1-azine-2-undecylimidazole ($C_{11}Z$-AZINE) were blended in the ratio as shown in Table 3 to obtain several epoxy resin compositions. The gel time of these compositions and the heat distortion temperature (HDT) of the cured products obtained by heating the compositions at 170° C for 3 hours are shown in Table 3. Also, the above-mentioned compositions were dissolved in a mixture of 65 parts of methyl ethyl ketone and 65 parts of acetone to prepare varnishes. Prepreg mica sheets and laminated sheets were then prepared by the use of the above-mentioned varnishes in the same manner as in Example 1. The properties of the prepreg mica sheets and laminated sheets thus obtained are shown in Table 3.

Table 3

| Sample No. | CY-175 (Parts) | Ch-206 (Parts) | HP-203N (Parts) | $C_{11}Z$-AZINE (Parts) | Gel time (min.) of varnish at 150° C | HDT (° C) | Storage stability (days) of prepreg mica sheet | Temperature at which dielectric loss tangent of laminated sheet becomes 10 % (° C) | Bending strength (kg/cm²) at 80° C | |
|---|---|---|---|---|---|---|---|---|---|---|
| | | | | | | | | | Initial stage | After deterioration at 25° C for 30 days |
| 11 | 95 | 5 | 35 | 3 | 9.9 | 200 | 40–50 | 208 | 2435 | 1314 |
| 12 | 80 | 20 | 35 | 3 | 9.1 | 195 | >60 | 200 | 2388 | 1286 |
| 13 | 70 | 30 | 35 | 3 | 8.7 | 191 | >60 | 199 | 2426 | 1116 |
| 14 | 70 | 30 | 20 | 3 | 9.3 | 183 | >60 | 192 | 1962 | 1122 |
| 15 | 70 | 30 | 45 | 3 | 11.2 | 195 | 30–40 | 197 | 1976 | 1304 |

EXAMPLE 4

2-(3,4-epoxy)cyclohexyl-5,5-spiro(3,4-epoxy)cyclohexane-m-dioxane (CY-175), 3,4-epoxycyclohexylmethyl-3,4-epoxycyclohexanecarboxylate (Ch-221), vinylcyclohexenedioxide (Ch-206), a phenol-formaldehyde condensate (HP-203N) and 1-azine-2-undecylimidazole ($C_{11}$Z-AZINE) were blended in the ratio as shown in Table 4 to prepare several epoxy resin compositions. The gel time of these compositions and the heat distortion temperature (HDT) of the cured products obtained by heating the compositions at 170° C for 3 hours are shown in Table 4. Also, the above-mentioned compositions were respectively dissolved in a mixture of 65 parts of methyl ethyl ketone and 65 parts of acetone to prepare varnishes. Prepreg mica sheets and laminated sheets were then prepared by the use of the above-mentioned varnishes. The properties of the prepreg mica sheets and laminated sheets thus obtained are shown in Table 4.

206), was added 35 parts of a phenol-formaldehyde condensate (HP-203N, OH value 107, softening point 65° – 72° C or HP-607N, OH value 105, softening point 78° – 86° C manufactured by Hitachi Kasei Kogyo K.K. or No. 1000 WS. softening point 99° – 105° C, unreacted phenol content less than 4% by weight manufactured by Mitsui Toatsu Kagaku K.K.) as a curing agent, and further, as a curing accelerator, 3 parts each of 2-phenylimidazole (2PZ), 2-undecylimidazole ($C_{11}$Z), 2-heptadecylimidazole ($C_{17}$Z), 2-phenyl-4-methylimidazole (2P4MZ), 1-cyanoethyl-2-methylimidazole (2MZ-CN), 1-cyanoethyl-2-ethyl-4-methylimidazole (2E4MZ-CN), 2-cyanoethyl-2-undecylimidazole ($C_{11}$Z-CN), 1-cyanoethyl-2-phenylimidazole (2PZ-CN), 1-azine-2-methylimidazole (2MZ-AZINE), 1-azine-2-undecylimidazole ($C_{11}$Z-AZINE), 1-azine-2-ethyl-4-methylimidazole (2E4-MZ-AZINE) and 1-cyanoethyl-2-methyl-4-ethylimidazole (2M4EZ-CN) were separately added. The mixtures were dissolved in a mixture Table 4

| Sample No. | CY-175 (Parts) | Ch-221 (Parts) | Ch-206 (Parts) | HP-203N (Parts) | $C_{11}Z$—AZINE (Parts) | Gel time (min.) of varnish at 150° C | HDT (° C) | Storage stability (days) of prepreg mica sheet | Temperature at which dielectric loss tangent of laminated sheet becomes 10 % (° C) | Bending strength (kg/cm²) at 180° C | |
|---|---|---|---|---|---|---|---|---|---|---|---|
| | | | | | | | | | | Initial stage | After deterioration at 25° C for 30 days |
| 16 | 90 | 10 | 15 | 35 | 3 | 10.2 | 193 | >60 | 195 | 2015 | 1515 |
| 17 | 70 | 30 | 10 | 35 | 3 | 10.0 | 199 | >60 | 201 | 2495 | 1482 |
| 18 | 70 | 30 | 15 | 35 | 3 | 11.3 | 188 | >60 | 193 | 2187 | 1350 |
| 19 | 60 | 40 | 5 | 35 | 3 | 10.7 | 207 | >60 | 208 | 2599 | 1576 |
| 20 | 60 | 40 | 10 | 35 | 3 | 10.5 | 203 | >60 | 202 | 2512 | 1417 |
| 21 | 60 | 40 | 15 | 35 | 3 | 10.1 | 193 | >60 | 191 | 2320 | 1220 |
| 22 | 40 | 60 | 20 | 35 | 3 | 10.8 | 185 | >60 | 187 | 1841 | 1132 |

EXAMPLE 5

To an epoxy resin system consisting of 55 parts of 2-(3,4-epoxy)cyclohexyl-5,5-spiro(3,4-epoxy)cyclohexane-m-dioxane (CY-175), 36 parts of 3,4-epoxycyclohexylmethyl-3,4-epoxycyclohexanecarboxylate (Ch-221) and 9 parts of vinylcyclohexenedioxide (Chof 65 parts of methyl ethyl ketone and 65 parts of acetone to prepare several epoxy resin compositions. Prepreg mica sheets and laminated sheets were prepared by the use of the above-mentioned compositions in the same manner as in Example 1. The properties of the prepreg mica sheets and laminated sheets thus obtained are shown in Table 5.

Table 5

| Sample No. | Curing agent | Curing accelerator | Gel time (min.) of varnish at 150° C | Storage stability (days) of prepreg mica sheet | Temperature at which dielectric loss tangent of laminated sheet become 10 % (° C) | Bending strength (kg/cm²) at 180° C | |
|---|---|---|---|---|---|---|---|
| | | | | | | Initial stage | After deterioration at 25° C for 30 days |
| 26 | HP-203N | 2PZ | 8.5 | 20–30 | 183 | 1962 | 1450 |
| 27 | ″ | $C_{11}Z$ | 10.0 | 40–50 | 200 | 2495 | 1447 |
| 28 | ″ | $C_{17}Z$ | 12.5 | 40–50 | 185 | 1971 | 1482 |
| 29 | ″ | 2P4MZ | 9.3 | 20–30 | 182 | 1847 | 1339 |

Table 5-continued

| Sample No. | Curing agent | Curing accelerator | Gel time (min.) of varnish at 150° C | Storage stability (days) of prepreg mica sheet | Temperature at which dielectric loss tangent of laminated sheet become 10 % (° C) | Bending strength (kg/cm$^2$) at 180° C | |
|---|---|---|---|---|---|---|---|
| | | | | | | Initial stage | After deterioration at 25° C for 30 days |
| 30 | '' | 2MZ—CN | 8.5 | 30–40 | 186 | 1852 | 1427 |
| 31 | '' | 2E4MZ—CN | 9.8 | 30–40 | 189 | 1982 | 1418 |
| 32 | '' | C$_{11}$Z—CN | 13.2 | >60 | 199 | 2521 | 1462 |
| 33 | HP-203N | 2PZ—CN | 13.3 | >60 | 185 | 2027 | 1425 |
| 34 | '' | 2MZ—AZINE | 8.7 | 40–50 | 189 | 2071 | 1386 |
| 35 | '' | 2E4MZ—AZINE | 9.0 | 40–50 | 192 | 2035 | 1395 |
| 36 | HP-607N | C$_{11}$Z—AZINE | 10.2 | >60 | 203 | 2585 | 1476 |
| 37 | 1000WS | '' | 9.9 | >60 | 187 | 2019 | 1396 |
| 38 | HP-203N | 2M4EZ—CN | 9.0 | 30–40 | 185 | 1915 | 1422 |

REFERENCE EXAMPLE 2-(3,4-Epoxy)cyclohexyl-5,5-spiro(3,4-epoxy)cyclohexane-m-dioxane (CY-175), 3,4-epoxycyclohexyl-methyl-3,4-epoxycyclohexanecarboxylate (Ch-221), vinylcyclohexenedioxide (Ch-206), Epikote 152 (manufactured by Shell Chemical Co.), a phenol-formaldehyde condensate (HP-203N), boron trifluoride monoethylamine (BF$_3$-400 manufactured by Shell Chemical Co.) and 1-azine-2-undecylimidazole (C$_{11}$Z-AZINE) were blended in the ratio as shown in Table 6. The resulting mixtures were dissolved in a mixture of 65 parts of methyl ethyl ketone and 65 parts of acetone to prepare several epoxy resin compositions. Prepreg mica sheets and laminated sheets were prepared by the use of the above-mentioned compositions (varnishes) in the same manner as in Example 1. The curability of the above-mentioned varnishes and the properties of the prepreg mica sheets and laminated sheets thus obtained are shown in Table 6.

tadecylimidazole, 2-phenyl-4-methylimidazole, 1-cyanoethyl-2-methylimidazole, 1-cyanoethyl-2-ethyl-4-methylimidazole, 1-cyanoethyl-2-methyl-4-ethylimidazole, 1-cyanoethyl-2-undecylimidazole, 1-cyanoethyl-2-phenylimidazole, 1-azine-2-methylimidazole, 1-azine-2-undecylimidazole and 1-azine-2-ethyl-4-methylimidazole as the imidazole curing accelerator.

2. An epoxy resin composition according to claim 1, wherein a mixture consisting of 90 to 40% by weight of 2-(3,4-epoxy)cyclohexyl-5,5-spiro(3,4-epoxy)cyclohexane-m-dioxane and 10 to 60% by weight of 3,4-epoxycyclohexylmethyl-3,4-epoxycyclohexanecarboxylate is used as the alicyclic epoxy resin.

3. An epoxy resin composition according to claim 2, wherein a mixture obtained by blending 5 to 20 parts by weight of vinylcyclohexenedioxide with 100 parts by weight of said mixture consisting of 2-(3,4-epoxy)cyclohexyl-5,5-spiro(3,4-epoxy)cyclohexane-m-dioxane and 3,4-epoxycyclohexylmethyl-3,4-cyclohexanecar- Table 6

| Sample No. | CY-175 (Parts) | Ch-221 (Parts) | Ch-206 (Parts) | EP-152 (Parts) | HP-203N (Parts) | Curing accelerator | | Gel time (min.) of varnish at 150° C | Storage stability (days) of prepreg mica sheet | Temperature at which dielectric loss tangent of laminated sheet becomes 10 % (° C) | Bending strength (kg/cm$^2$) at 180 ° C | |
|---|---|---|---|---|---|---|---|---|---|---|---|---|
| | | | | | | Kind | Parts | | | | Initial stage | After deterioration at 25° C for 30 days |
| 39 | 55 | 36 | 9 | — | 35 | BF$_3$ 400 | 3 | 3.5 | >60 | 81 | Impossible to measure | Impossible to measure |
| 40 | 55 | 36 | 9 | — | — | C$_{11}$Z—AZINE | 3 | 8.7 | >60 | 135 | '' | '' |
| 41 | 46 | 31 | 23 | — | 35 | '' | 3 | 8.8 | >60 | 170 | 1533 | 415 |
| 42 | — | 100 | — | — | 35 | '' | 3 | 15.2 | >60 | 172 | 521 | 308 |
| 43 | — | — | 100 | — | 35 | '' | 3 | 13.0 | 40–50 | 100 | Impossible to measure | Impossible to measure |
| 44 | — | — | — | 100 | 35 | '' | 3 | 3.5 | >60 | 92 | '' | '' |

What is claimed is:

1. An epoxy resin composition comprising an alicyclic epoxy resin, a curing agent having phenolic hydroxyl group in its molecule and an imidazole accelerator, characterized in that said composition is obtained by blending 100 parts by weight of 2-(3,4-epoxy)cyclohexyl-5,5-spiro(3,4-epoxy)cyclohexane-m-dioxane as the alicyclic epoxy resin, 25 to 50 parts by weight of a phenol-formaldehyde condensate as the curing agent having phenolic hydroxyl group in its molecule and 0.1 to 15 parts by weight of at least one imidazole compound selected from the group consisting of 2-phenylimidazole, 2-undecylimidazole, 2-hepboxylate is used as the alicyclic epoxy resin.

4. An epoxy resin composition according to claim 2, wherein the amount of said imidazole curing accelerator contained in the composition is 0.5 to 10 parts by weight.

5. An epoxy resin composition according to claim 1, wherein said composition contains a sheet-form substrate.

6. An epoxy resin composition according to claim 2, wherein said composition contains a sheet-form substrate.

* * * * *